May 19, 1942.  F. J. EVANS  2,283,495
CONTINUOUS FILTER
Original Filed July 3, 1939

INVENTOR
FRANKLIN J. EVANS
BY
ATTORNEY

Patented May 19, 1942

UNITED STATES PATENT OFFICE 2,283,495

CONTINUOUS FILTER

Franklin J. Evans, Hazleton, Pa., assignor to Oliver United Filters Incorporated, Oakland, Calif., a corporation of Nevada Original application July 3, 1939, Serial No. 282,710. Divided and this application September 2, 1941, Serial No. 409,184

6 Claims. (Cl. 210—201)

This application is a division of my application Serial No. 282,710 filed July 3, 1939, for "Continuous filters."

This invention relates in general to rotary drum filters and in particular to a valve mechanism by which the pressures on either side of the cake formed on the drum can be equalized just prior to the point of discharge so that the cake may be removed more readily.

Ordinarily the drum of a rotary drum filter is provided on its periphery with a plurality of independent filtrate compartments. Each of these compartments communicates with an automatic valve carried on one of the drum trunnions and by means of which each of the filtrate compartments may be successively subjected to either subatmospheric pressure, atmospheric pressure, or superatmospheric pressure, as desired, for the purpose of picking up a cake during the actual filtering cycle and for then discharging the cake from the drum. The capacity of a filter of this type is somewhat restricted and therefore filters have recently been built wherein the drum is formed on its periphery with individual compartments, each provided with an independent valve opening directly into the interior of the drum. The filtrate entering the drum from the filtrate compartments passes out of the drum through one of the hollow trunnions to a barometric leg or vacuum receiver.

In operation, the interior of the drum is maintained under subatmospheric pressure and the valves referred to are closed once during each revolution of the drum so as to seal the section or compartment being discharged from the action of vacuum within the drum. A filter of this type is shown in the Young Patent No. 2,052,156, and although this type of filter has a very high capacity, some trouble has been experienced with the individual gravity operated valves. It is frequently necessary to adjust these valves and since there are eighteen of them in an average size filter and since to adjust any one of them the filter must be shut down, a great deal of time is lost.

In general, the object of my invention is the provision of a non-sectionalized rotary drum filter having an unobstructed interior and provided with means for continuously blanking off that portion of the drum which is being discharged.

More specifically, the object of this invention is the provision of a non-sectionalized rotary drum filter wherein the interior of the drum is blanked off by an endless band so mounted as to contact and seal that portion of the drum which is being discharged of its cake.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing.

Figure 1:
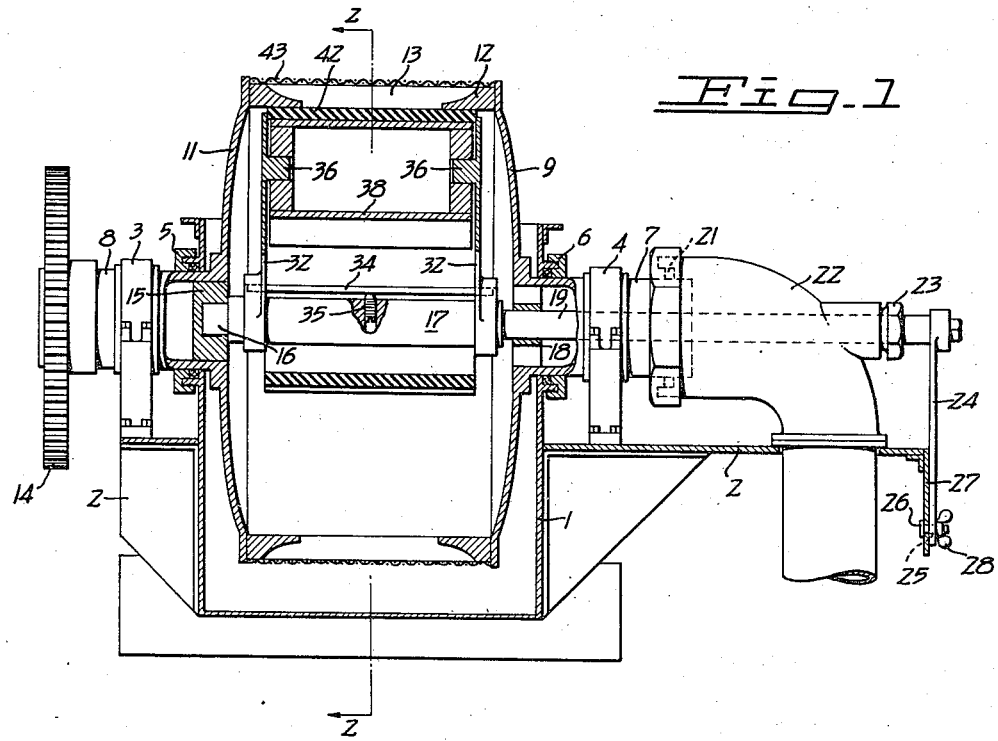
Figure 1 is a section of a rotary drum filter embodying the objects of my invention, taken on the line 1—1 of Figure 2.
Figure 2:
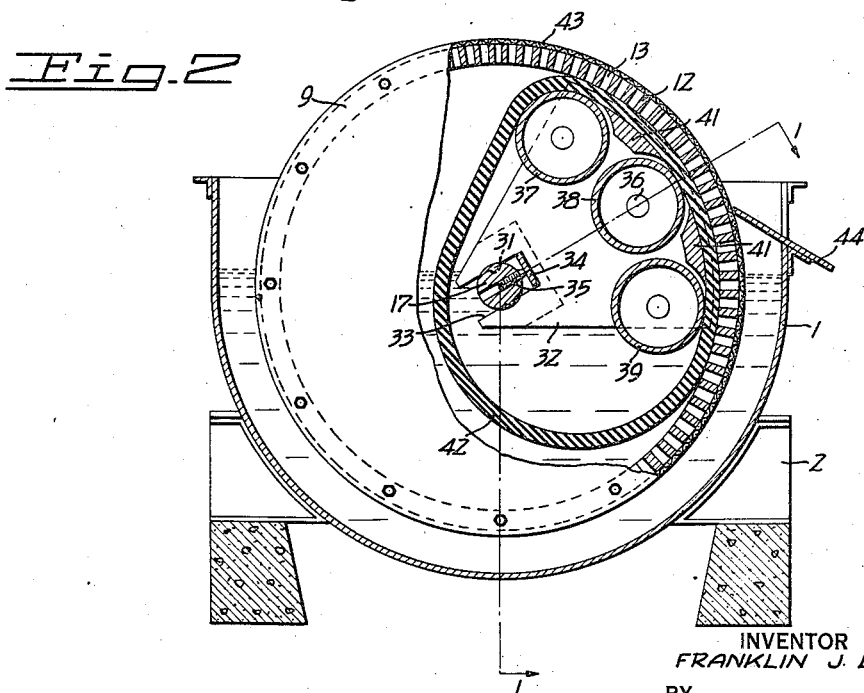
Figure 2 is a section taken on the line 2—2 of Figure 1.

The filter shown in these figures comprises a generally semi-cylindrical tank 1 mounted on a suitable frame 2. Journaled on bearings 3 and 4 carried by the frame 2 and passing through stuffing boxes 5 and 6 formed in the ends of the tank 1 are trunnions 7 and 8. Formed integral with the trunnions 7 and 8 are dished drum heads 9 and 11, between which is bolted and sealed a drum or cylinder 12 formed with milled slots 13 establishing communication between the exterior and interior of the drum. Carried on the outer end of the trunnion 8 is a ring gear 14 for driving the drum 12, and secured within the inner end of this trunnion is a bushing 15 within which is journaled a stub shaft 16 carried by a cylinder 17. Secured to the opposite end of the cylinder 17 and journaled in a spider 18 accommodated within the trunnion 7 is a shaft 19. Sealed to the outer end of the trunnion 7 by a stuffing box 21 is an elbow 22 formed with a stuffing box 23 through which the end of the shaft 19 passes. Keyed to the end of the shaft 19 is a sector 24 formed with an arcuate slot 25 for the accommodation of a bolt 26 secured to an extension 27 of the frame 2. The sector 24 may be secured in any desired angular position by a wing nut 28 threaded on the bolt 26.

Formed on either end of the cylinder 17 are spaced parallel slots 31 for the reception of radially extending valve end plates 32. The valve end plates are formed with notches 33 for the accommodation of the cylinder 17 and a spring steel plate 34. Threaded diametrically through the cylinder 17 is a set screw 35, the outer end of which abuts the spring 34, thereby forcing the valve end plates radially outward. Extending inwardly of the plates 32 are pins 36 on which are journaled parallel cylinders 37, 38, and 39 extending across the entire length of the drum 12. Secured between the valve end plates 32 and between the valleys formed by the cylinders 37, 38, and 39, are webs 41 which together with the cylinders define a surface substantially conforming with the inner surface of the drum 12. Encircling the cylinders 37, 38, and 39 and the webs 41 is a soft rubber belt or band 42 arranged to be held in frictional engagement with the inner surface of the drum 12 by these cylinders and webs and which may be considered as an endless shoe. The drum 12 is covered with a suitable filter medium 43, and the tank 1 carries a doctor or scraper 44 by means of which the cake formed on this filter medium as a result of the filtering operation may be removed. Since the valve end plates 32 are keyed to the shaft 19 and since the shaft 19 may be rotated within limits by the sector 24 and secured in any predetermined position by the wing nut 28, it will be seen that the endless belt or band 42 may be made to seal off the interior of the drum at a point opposite the doctor or scraper 44. By so sealing off the drum, the differential filtering pressure is cut off at this point, and since the cake formed on the filter medium 43 is to some extent porous, the pressure on the inner and outer surfaces of the cake will for practical purposes become immediately equalized. When the external and internal pressures on either side of the cake are equalized, there will be little or no difficulty experienced in removing the cake from the drum by the doctor or scraper 44 or other suitable discharging mechanism. It should be noted that the spring 34 urges the endless band or shoe 42 into engagement with the interior surface of the drum against the action of the external atmospheric pressure and that the resiliency of the shoe 42 and spring 34 are ample to produce an effective seal between the shoe and drum.

In the invention as above described, the differential filtering pressure is cut off from that portion of the drum being discharged by means of the endless band or shoe supported by rolls carried on a stationary frame. By this construction the necessity of adjusting and maintaining in adjustment an individual valve such as shown in the Young patent above referred to, and each of the filtrate compartments is dispensed with.

The pulp or slurry being filtered is maintained at a level in the filter tank above the lower level of the drum trunnion so that the filtrate within the drum may pass outwardly through the right hand trunnion and the elbow connected therewith to a vacuum receiver or other suitable source of subatmospheric pressure. As the drum is slowly rotated through the tank, a deposit of solids is formed on the outer surface of the drum. At the point of discharge the differential pressure between the exterior and interior of the cake is relieved by the endless band in contact with the inner surface of the drum, and sufficient air passes inwardly through the cake so as to equalize the pressure on both sides of the cake. Under these conditions the cake discharging device operates far more effectively in removing the cake from the drum.

I claim:

1. A filter comprising: a closed-ended perforate drum mounted for rotation through a body of material to be filtered; means for maintaining said drum under an inwardly directed differential filtering pressure; discharge means adjacent one side of the exterior peripheral surface of said drum for removing cake formed thereon; an endless belt mounted within said drum; and means for holding a portion of said belt in rolling frictional engagement with the inner surface of said drum along a zone opposite said discharge means.

2. A filter comprising: a tank; a closed-ended perforate drum mounted for rotation within said tank; means for maintaining said drum under an inwardly directed differential filtering pressure; discharge means adjacent one side of the exterior peripheral surface of said drum for removing cake formed thereon; an endless belt mounted within said drum and means for holding a portion of said belt in rolling frictional engagement with the inner surface of said drum along a zone opposite said discharge means.

3. A filter comprising: a tank; a closed-ended perforate drum mounted for rotation within said tank; means for maintaining said drum under an inwardly directed differential filtering pressure; discharge means adjacent one side of the exterior peripheral surface of said drum for removing cake formed thereon; an endless belt disposed within said drum and arranged for frictional engagement and travel with a zone of the interior peripheral surface of said drum opposite said discharge means; and means for adjusting the pressure between the contacting surfaces of said belt and said drum.

4. A filter comprising: a closed-ended perforate drum mounted on trunnions for rotation through a body of material to be filtered; means for maintaining said drum under an inwardly directed differential filtering pressure; discharge means adjacent one side of the exterior peripheral surface of said drum for removing cake formed thereon; a stationary frame supported by said trunnions within said drum; a plurality of idler rolls supported by said frame adjacent the inner surface of said drum opposite said discharge means; and an endless belt arranged to travel about said idler rolls in frictional engagement with a zone of said drum opposite said discharge means.

5. A filter comprising: a closed-ended perforate drum mounted on trunnions for rotation through a body of material to be filtered; means for maintaining said drum under an inwardly directed differential filtering pressure; discharge means adjacent one side of the exterior peripheral surface of said drum for removing cake formed thereon; a stationary frame supported by said trunnions within said drums; a plurality of idler rolls supported by said frame adjacent the inner surface of said drum opposite said discharge means; an endless belt arranged to travel about said idler rolls in frictional engagement with a zone of said drum opposite said discharge means; and means for adjusting the clearance between said idler rolls and said drum.

6. A filter comprising: a tank; a closed-ended perforate drum mounted for rotation within said tank; means for maintaining said drum under an inwardly directed differential filtering pressure; discharge means adjacent one side of the exterior peripheral surface of said drum for removing cake formed thereon; a frame mounted within said drum so as to have substantially no movement with respect to said tank when the filter is in operation; a plurality of spaced, parallel, longitudinally extending rolls mounted for rotation on said frame at a point opposite said discharge means; and an endless band encircling said rolls and held by said rolls in frictional engagement with the inner periphery of said drum.

FRANKLIN J. EVANS.